No. 890,047. PATENTED JUNE 9, 1908.
J. C. W. GRETH.
WATER PURIFYING APPARATUS.
APPLICATION FILED JAN. 11, 1907.
2 SHEETS—SHEET 2.
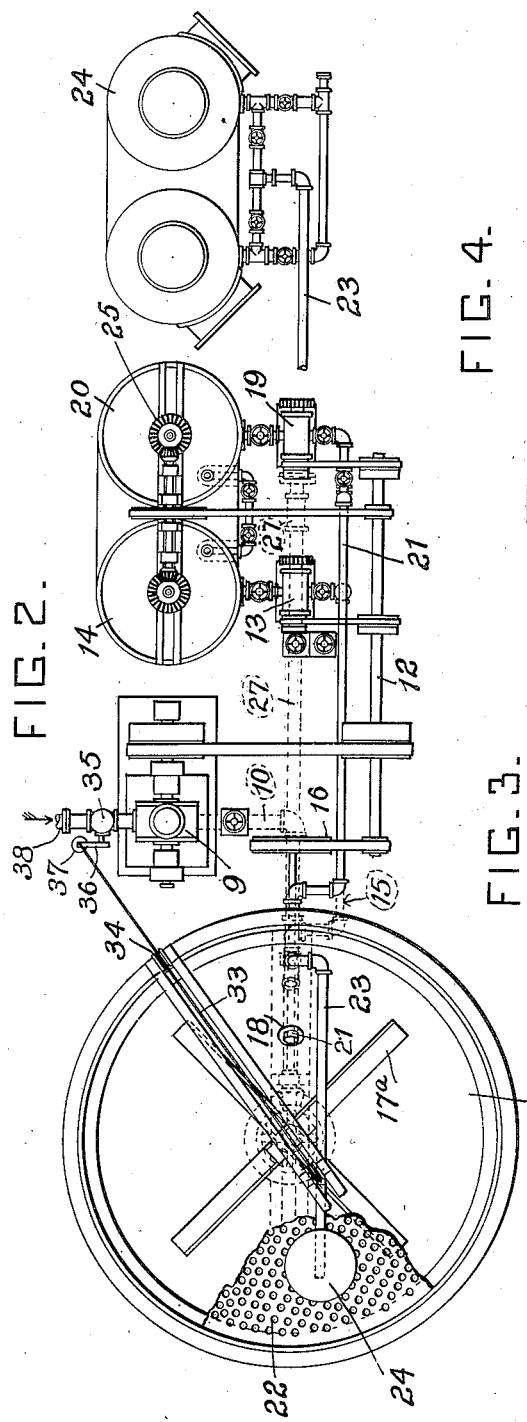
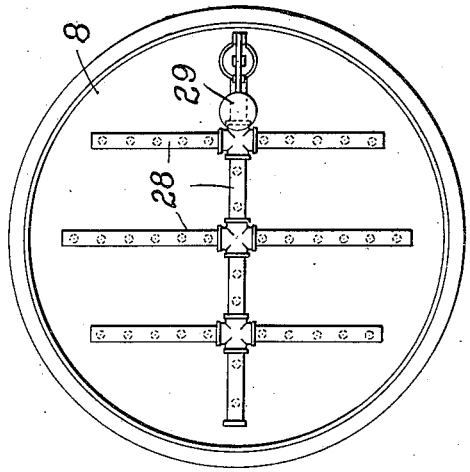
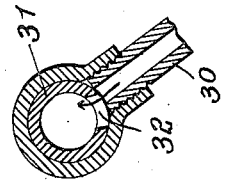
WITNESSES:
J. Herbert Bradley.
Fred Stant.
John C. W. Greth INVENTOR
By J. W. H. Clay
Atty.

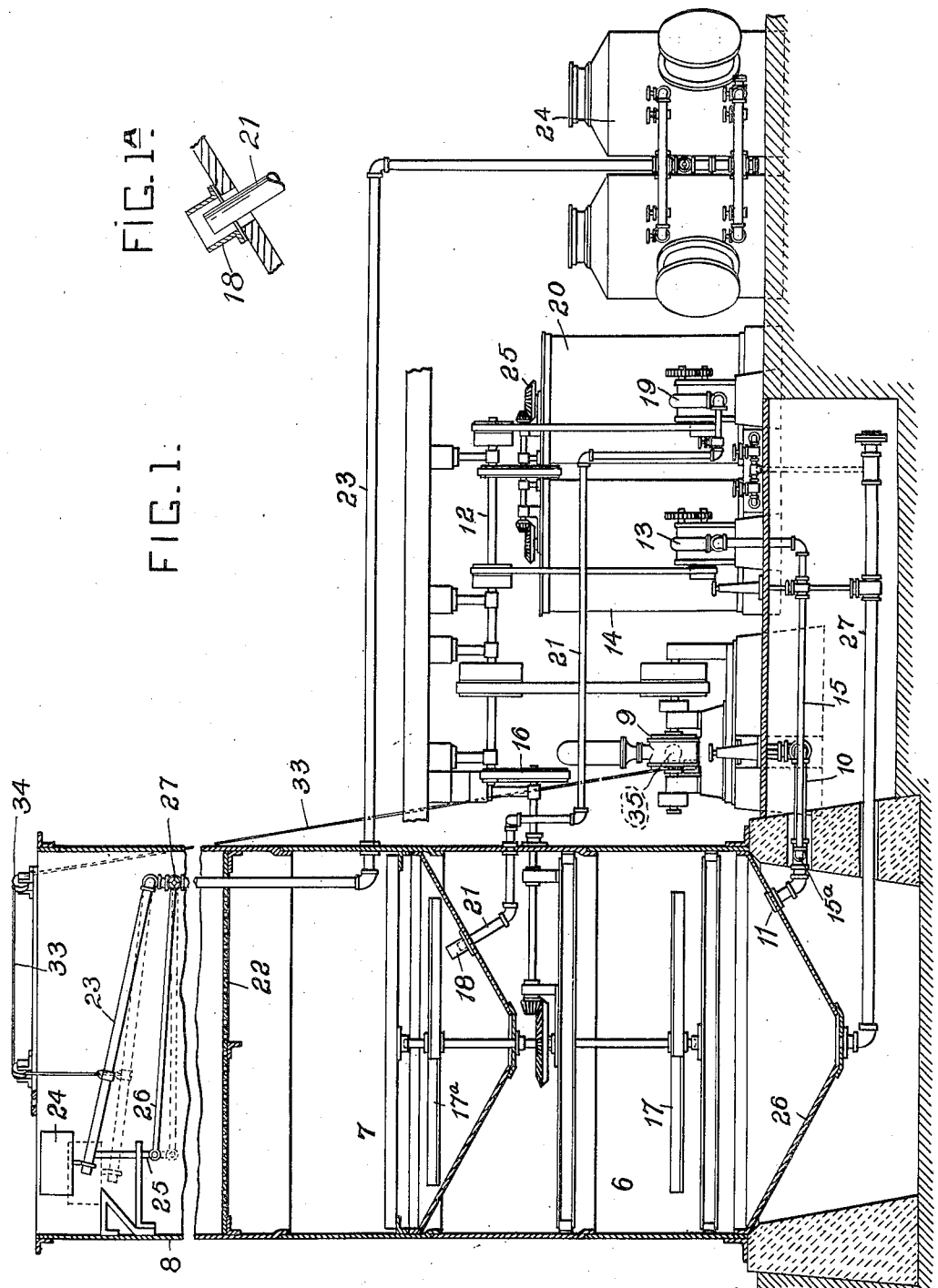

UNITED STATES PATENT OFFICE.

JOHN C. W. GRETH, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

WATER-PURIFYING APPARATUS.

No. 890,047.     Specification of Letters Patent.     Patented June 9, 1908.

Application filed January 11, 1907. Serial No. 351,865.

*To all whom it may concern:*

Be it known that I, JOHN C. W. GRETH, a citizen of the United States, residing at Pittsburg, in the State of Pennsylvania, have invented certain new and useful Improvements in Water - Purifying Apparatus, of which the following is a specification.

My invention relates more particularly to the continuous systems of water purifying apparatus and to the tower type of such apparatus as illustrated in my former patent No. 786,559 granted April 4, 1905.

The primary objects of the invention are to construct the system in a more compact form, and so arrange the various tanks as to operate the whole apparatus from the ground; to provide an improved construction of the various tanks and the mode of feeding them; to provide an outlet from the system with an automatic stop valve and prevent the air locking of the filters; to provide superior means for operating stirring devices and more accurate devices for feeding the re-action chemicals. These objects and other advantages to hereinafter appear I attain by the construction illustrated in preferred form in the accompanying drawings forming part of this specification.

Figure 1 is a vertical section through the several tanks and showing in side elevation an outline of the whole apparatus and Fig. 1ª is a detail. Fig. 2 is a plan view of the apparatus with some parts omitted. Figs. 3 and 4 are respectively a plan and a side elevation and section, of an improved form of outlet from the settling tank. Fig. 5 illustrates another form of valve, placed directly on the outlet pipe.

In purifying plants requiring a large volume of water, it will be recognized as very inconvenient to have the apparatus placed on top of the storage tanks as is customary, and it is also disadvantageous to have to elevate the water twice as is usually the case in downward flow systems. Another difficulty to be met in continuous systems is that the outlet pipes from the settling tanks are often allowed to fill with air when the water level falls too low or when the apparatus ceases to flow, and when it starts operation again this air in the outlet pipe enters the filters and locks them. My apparatus is designed in part to meet these objections and also to avoid the inconvenience of having motors and pumps and stirring devices elevated in position where they are difficult to reach by the attendant.

In the arrangement shown, Fig. 1 represents a tower much attenuated, and consisting in the main of three divisions of which the compartment 6 is ordinarily used for lime treatment, the compartment 7 for soda treatment, and the compartment 8 for storage and settling. At a convenient place on the ground I provide a water motor 9 which receives the main supply of water from the pipe 38 under head, and discharges through the large pipe 10 and an outlet 11 directly into the compartment 6. The motor 9 operates a countershaft 12 from which is driven a pump 13 forcing out of the lime solution tank 14 a regulated quantity of the chemical, and this is carried through pipe 15 to a convenient point 15ª where it empties into the main water supply pipe 10 just before it enters the treatment tank.

By suitable gearing 16 driven from countershaft 12, special inclined form of mechanical stirring devices 17 and 17ª are kept moving in the compartments 6 and 7 and give the water a rolling motion in addition to rotation. The water after treatment to the lime in compartment 6 flows through an outlet 18 in the conical bottom of compartment 7 and by means of a pump 19 also driven from the countershaft 12, a second chemical such as soda solution is drawn from the mixing tank 20 and discharged through a similar pipe 21 which empties into the inlet 18 as shown in Fig. 1ª so as to mix with the water from compartment 6 just as it enters the re-action compartment 7 after being treated with lime. From this compartment the water is raised through the perforated bottom 22 of the storage and settling compartment 8 and as it is needed it is drawn off through a floating outlet pipe 23 supported by float 24. By any convenient means, such as a vertical rod 25 which will engage with the float when it drops to a specified position and operates a lever arm 26, a valve 27 in the outlet pipe is closed, so that the movable portion 23 of the outlet pipe can never be exposed to the air and draw air therein. By the cord 33 passing over the pulley 34 and connecting the pipe 23 with the arm 36 of valve 35 on the inlet pipe 38 leading to the motor 9, the inflow is stopped when the settling tank is full. That is, the arm 36 is drawn down by the weight 37 as the float 24 rises, and this stops the inflow. The outlet pipe 23 may be conveniently led to the filters 24 which are set upon the ground or at any convenient place.

In the chemical mixing tanks 14 and 20 are provided mechanical stirrers which by suitable gearing 25 are also driven from the shaft 12 by the water motor 9.

In Figs. 3 and 4 I show a modified form of the outlet from the settling tank. The pipe 23 may be provided with any convenient series of branches such as 28 which are preferably well distributed throughout the area of the tank and are perforated underneath so as to take in the water near the surface. In order to prevent these pipes from being filled with air when the system is stopped or the water level falls, the top of the pipe 23 has a balanced disk valve $23^a$ which is closed by means of a float 29 when the water level falls. Otherwise the same result may be attained as shown in Fig. 5, where the movable portion 30 of the outlet pipe is arranged to surround a slotted stationary portion 31, so that by the movement of the part 30 which corresponds to the arm 23 shown in the top of Fig. 1, the slot or opening 32 may be closed when the float end of the pipe drops to a certain point thus preventing the entry of air and maintaining the outlet pipe filled with water. This is important, as it prevents locking of the filters when the apparatus is started again, by carrying down a pipe full of air.

The conical bottom 26 of the tower makes it convenient to draw off the sludge through pipe 27 to the sewer when desired. Suitable valves are shown in the drawings for manipulating the various connections and these will be understood without further explanation.

It will be seen that by this system the water may be taken in on the ground level and run the motor 9 as it passes to the purifying apparatus. The entire motion of the water through the system is upward under pressure and this serves to better mix the chemicals with the water, as precipitates are well known to further aid in additional precipitation. The chemicals being introduced under pressure at the exact point of inflow to each treatment tank facilitates the action, while the currents are all in opposition to the tendency of solid matter to collect at the bottom. The water being drawn off from near the surface of the settling compartment 8, avoids taking out any solid matter and by reason of the devices to close the outlet pipe when the inflow ceases at the bottom, I effectually prevent the carrying in of air to the draw-off pipe. Various other advantages of the apparatus will readily occur to those familiar with the art.

It will be observed that in this system, not only is the water treated with chemicals under head and in an upward flow current which thoroughly commingles them, but the apparatus has the additional advantage of treating the water to lime separately and completely before the soda treatment is commenced. This makes it easier for the operator to test and determine his lime treatment by reason of having only one chemical to deal with.

By reason of the same float 24 governing the inlet at 35 and outlet at pipe 23 and operating from the water level in the storage tank, the system is entirely automatic, the float on reaching its upper limit of travel stopping the inflow without stopping the outflow, while on reaching its lower limit of travel it stops the outflow without stopping the inflow, thus balancing the water level accurately and automatically and allowing between the two points of travel as much storage head as may be desired without affecting the automatic operation.

Having thus described my invention and illustrated its use, what I claim as new and desire to secure by Letters Patent is the following:

1. In continuous water purifying apparatus the combination with a filter and an elevated settling tank, of a draw-off pipe in the settling tank adapted to supply the filter, and means to keep the draw-off pipe always under water and to close it when the level in the settling tank falls, substantially as described.

2. In water purifying apparatus, the combination with an elevated settling tank, of an intake comprising a pipe with a system of perforated branch pipes near the surface of the water, a valve in the pipe and a float operating the valve to close the intake pipe when the water falls in said tank.

3. In water purifying apparatus a single treatment tank comprising a series of compartments placed in succession one above another and communicating directly together under continuous head, means for maintaining an upward flow through said compartments, means for introducing chemical solutions under head into the bottoms of each of said compartments, and means to draw off the water from the top of the top compartment provided with an automatic valve to prevent the entry of air when the flow stops.

4. The combination of a series of superimposed treatment tanks, a main water supply and means operated by said supply to introduce chemical solutions under head therein, a filter, means to draw water from the top compartment to the filter and a device to prevent the entry of air into the draw-off pipe when the flow stops, substantially as set forth.

5. In water purifying apparatus the combination with a continuous tower series of treatment tanks communicating one above another, including a settling tank at the top, of a water inlet at the base of the tower and a motor operated thereby, stirring devices in said compartments operated by said motor, chemical supply tanks, and pumps forcing the chemical into the treatment tanks and operated by said water motor, and a governing valve for the motor operated by a float in the settling tank, substantially as described.

6. In water purifying apparatus the combination with a series of treatment tanks communicating together and placed one above another, a settling tank on top of the said series, a motor and pumps at the base of the tower adapted to regulate the flow of and supply chemicals thereto, a filter also at the base of the tower and means to draw water from the top of the tower into the filter, said means being provided with devices to prevent entry of air into the filters when the flow stops, substantially as described.

7. In a continuous water purifying system, the combination of a tower tank having inter-communicating compartments for the separate admixture of several chemicals, and a settling tank, of a water inlet at the bottom, and a motor run by said incoming water, a series of pumps supplying chemicals at definite points in the column of water in the tank, and run by said principal motor, stirring devices in the mixing compartments also run by said motor, and a float device in the settling tank regulating the incoming water at the motor, all the apparatus being on the ground in easy reach and all the movements of the parts governed directly by the inflowing water, substantially as described.

8. In a continuous water purifying system, the combination with a series of communicating vessels including a settling tank, of a float in said tank, inlet and outlet valves for the tank, and means governed by the float to stop the inflow as it rises and to stop the outflow when it falls, to certain limits.

9. In water purifying apparatus the combination with a continuous series of communicating tanks including a settling tank, of means in the latter to stop the flow into the system when the tank is full and stop the outflow when the tank is empty, whereby to provide room for storage between fixed limits of travel.

10. In water purifying apparatus an elevated settling tank and means providing an upward flow in to the same, a draw off pipe, means including valves to stop the inflow at a predetermined high level without stopping the outflow and to stop the outflow at a predetermined low level without stopping the inflow whereby to provide a controllable storage space, substantially as described.

In testimony whereof I have hereunto signed my name in the presence of the two subscribed witnesses.

JOHN C. W. GRETH.

In presence of—
  CHAS. S. LEPLEY,
  E. R. RODD.